United States Patent
Shah (10) Patent No.: US 8,285,828 B2
(45) Date of Patent: Oct. 9, 2012

(54) METHOD AND SYSTEM FOR PLATFORM LEVEL DATA MODEL FOR INDICATIONS BASED EVENT CONTROL AND DATA TRANSFER

(75) Inventor: Hemal Shah, Trabuco Canyon, CA (US)

(73) Assignee: Broadcom Corporation, Irvine, CA (US)

( * ) Notice: Subject to any disclaimer, the term of this patent is extended or adjusted under 35 U.S.C. 154(b) by 370 days.

(21) Appl. No.: 12/052,139

(22) Filed: Mar. 20, 2008

(65) Prior Publication Data

US 2008/0235363 A1    Sep. 25, 2008

Related U.S. Application Data

(60) Provisional application No. 60/896,239, filed on Mar. 21, 2007.

(51) Int. Cl.
   *G06F 15/173* (2006.01)
(52) U.S. Cl. ........ 709/223; 709/201; 709/246; 340/540; 717/136
(58) Field of Classification Search ........... 709/223–224
   See application file for complete search history.

(56) References Cited

U.S. PATENT DOCUMENTS

| | | | |
|---|---|---|---|
| 7,130,899 B1 * | 10/2006 | Bauer et al. | 709/223 |
| 7,152,242 B2 * | 12/2006 | Douglas | 726/23 |
| 7,206,863 B1 * | 4/2007 | Oliveira et al. | 709/245 |
| 7,665,071 B1 * | 2/2010 | Roles et al. | 717/130 |
| 2003/0014517 A1 * | 1/2003 | Lindsay et al. | 709/224 |
| 2005/0138111 A1 * | 6/2005 | Aton et al. | 709/201 |
| 2008/0046628 A1 * | 2/2008 | Hunsaker et al. | 710/315 |

OTHER PUBLICATIONS

DMTF, "Event MOF Specification 2.5," Jun. 12, 2001, DMTF, http://www.dmtf.org/sites/default/files/cim/cim_schema_v25/cim_events25.mof, all pages.*

* cited by examiner

*Primary Examiner* — Hua Fan
(74) *Attorney, Agent, or Firm* — Thomas, Kayden, Horstemeyer & Risley, LLP (57) ABSTRACT

For a platform level data model for indications based event control and data transfer, a management controller may enable performing indications based management operations that may be based on a management service utilizing CIM Indications model. The management controller may enable communication of indications based messaging and/or data. The indications may be triggered based on events generated and/or triggered in a plurality of managed entities. The events generation may be performed dynamically within the plurality of managed entities, or may be initiated via the management controller. The management controller may enable processing of partially generated indications, via the plurality of managed entities, and/or as pass-through router for full indications processed via the plurality of managed entities. The indications based management operations may also comprise subscription related operations wherein the management controller may enable performing processing of subscription requests, modifications, and/or deletions to facilitate external access via the device.

26 Claims, 5 Drawing Sheets

METHOD AND SYSTEM FOR PLATFORM LEVEL DATA MODEL FOR INDICATIONS BASED EVENT CONTROL AND DATA TRANSFER

CROSS-REFERENCE TO RELATED APPLICATIONS/INCORPORATION BY REFERENCE

This patent application makes reference to, claims priority to and claims benefit from U.S. Provisional Application Ser. No. 60/896,239 on Mar. 21, 2007.

The above stated application is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to network management. More specifically, certain embodiments of the invention relate to a method and system for a platform level data model for indications based event control and data transfer.

BACKGROUND OF THE INVENTION

Information Technology (IT) management may require performing remote management operations of remote systems to perform inventory and/or to determine whether remote systems are up-to-date. For example, management devices and/or consoles may perform such operations as discovering and/or navigating management resources in a network, manipulating and/or administrating management resources, requesting and/or controlling subscribing and/or unsubscribing operations, and executing and/or specific management methods and/or procedures. Management devices and/or consoles may communicate with devices in a network to ensure availability of remote systems, to validate that systems may be up-to-date, and/or to perform any security patch updates that may be necessary.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a platform level data model for indications based event control and data transfer, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a platform level data model for indications based event control and data transfer. In a device that may participate in network management operations, a management controller may be utilized to enable performing indications based management operations. The indications based management operations may utilize a management service that may be based on performing CIM operations over WS-Management protocol. The management controller may communicate, within the device, with a plurality of managed entities during indications based management operations. The plurality of managed entities may comprise an operating system (OS), a Basic Input/Output System (BIOS), chipsets, sensors, intelligent management devices, and/or one or more secondary management controllers. A management bus may be operable to enable interactions between the management controller and the plurality of managed entities to facilitate communication of indications related data and/or messaging. The indications based management operations may comprise generation and/or communication of indications, external to the device, via the management controller based on event generated and/or triggered within the plurality of managed entities. The events generation may be performed dynamically within the plurality of managed entities. The dynamic events generation may be based on event traps within the plurality of managed entities. The management controller may also initiate events generation in the plurality of managed entities. The management controller may enable processing of partially generated indications, via the plurality of managed entities, and/or as pass-through router for full indications processed via the plurality of managed entities. The indications based management operations may also comprise subscription related operations wherein the management controller may enable performing and/or processing of subscription requests, modifications, and/or deletions to facilitate external access via the device.

Figure 1A:
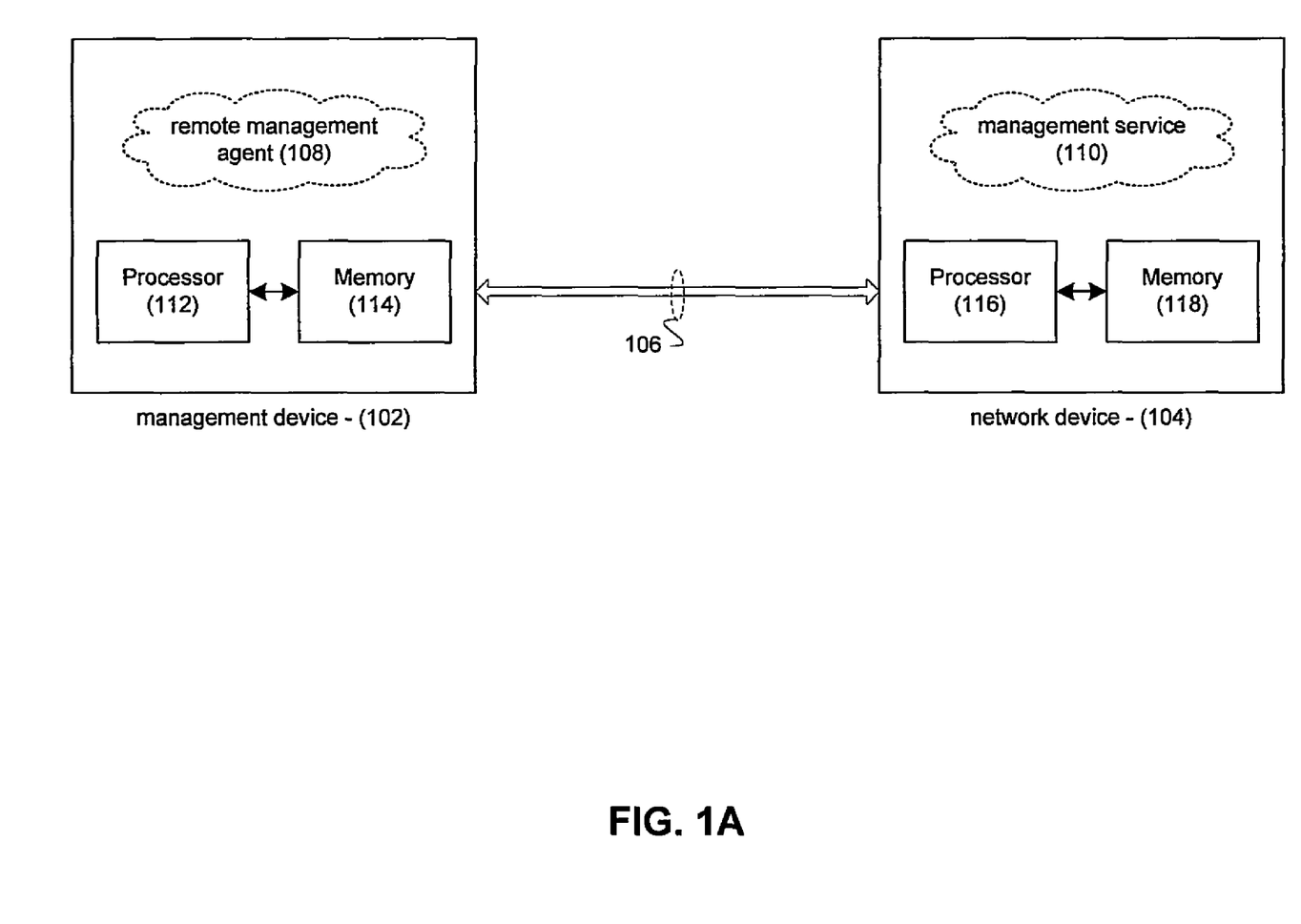
FIG. 1A is a block diagram that illustrates an exemplary communication setup between a management device and a network device, which may be utilized in accordance with an embodiment of the invention.

FIG. 1A is a block diagram that illustrates an exemplary communication setup between a management device and a network device, which may be utilized in accordance with an embodiment of the invention. Referring to FIG. 1A, there is shown a management device 102, a network device 104, a management connection 106, a remote management agent 108, and a management service 110.

The management device 102 may comprise suitable logic, circuitry, and/or code that may enable management of network devices, for example the network device 104, via a management connection, for example the management connection 106. For example, the management device 102 may be utilized by Information Technology (IT) operators to enable management of various devices in an IT network. The management device 102 may also comprise a dedicated entity, for example the remote management agent 108, to enable performing management operations, which may comprise discovering and/or navigating management resources in a network, manipulating and/or administrating management resources, requesting and/or controlling subscribing and/or unsubscribing operations, and executing and/or specific management methods and/or procedures. The management device 102 may perform management operations, via the remote management agent 108 for example, wherein the management device 102 may communicate with devices in a network to ensure availability of remote systems, to validate that systems may be up-to-date, and/or to perform any security patch updates that may be necessary.

The remote management agent 108 may comprise suitable logic, circuitry, and/or code that may enable performing management operations based on one or more management standards. For example, the remote management agent 108 may enable performing control and/or management operations, based on Web Service Management (WS-Management) and/or Alert Standard Format (ASF) protocols, of existing and/or known nodes, which support similar protocols, in a network. The remote management agent 108 may comprise a logical and/or software entity that may be integrated within an OS running in the management device 102. The remote management agent 108 may comprise a logical and/or software entity that may be integrated within a general network controller (NIC) which may be running in the management device 102. The remote management agent 108 may comprise a logical and/or software entity that may be integrated within a network controller running within a dedicated management sub-system within the management device 102.

The network device 104 may comprise suitable logic, circuitry, and/or code that may enable management by one or more management devices, for example the management device 102, via a management connection, for example the management connection 106. The network device 104 may be integrated into a network that may be managed by the management device 102. For example, the network device 104 may comprise a personal computer (PC), which may be operated in a network managed by the management device 102. Additionally, the network device 104 may also comprise a dedicated entity, for example the management service 110, to enable participating in management operations.

The management service 110 may comprise logic, circuitry, and/or code that may enable performing management operation based on one or more management standards. For example, the management service 110 may enable participating in control and/or management operations, based on WS-Management and/or ASF protocols. The management service 110 may comprise a logical and/or software entity that may be integrated within an OS running in the network device 104. The management service 110 may also comprise a logical and/or software entity that may be integrated within a general network controller (NIC) which may be running in the network device 104. Additionally, the management service 110 may comprise a logical and/or software entity that may be integrated within a network controller running within a dedicated management sub-system within the network device 104.

The management connection 106 may comprise a network interface and/or link that may enable management interactions and/or traffic between management devices, for example the management device 102, and network devices such as the network device 104. For example, the management connection may comprise a network connection, for example Ethernet (IEEE 802.3), which may enable the management device 102 and/or the network device 104 to exchange management messaging via Ethernet packets.

In operation, the management connection 106, via network traffic, may utilize one or more standards-based management protocols to enable performing management operations between the management device 102 and the network device 104. For example, the remote management agent 108 and/or the management service 110 may enable utilizing WS-management and/or ASF messaging, via the management connection 106, to enable management operations between the management device 102 and the network device 104.

The management connection 106 may comprise use of one or more management protocols specified and/or published by standards entities such as the Distributed Management Task Force (DMTF). The management connection 106 may comprise utilizing DMTF-based Alert Standard Format (ASF) protocol messaging and/or WS-Management protocol messaging. The Alert Standard Format (ASF) protocol may be utilized in first generation out-of-band management systems. The ASF protocol may comprise utilization of a User Datagram Protocol (UDP) stack to enable communication between management devices and network devices. Devices comprising ASF functionality and/or interface may be ASF capable, wherein said devices may perform management operations via ASF messages. For example, in instances where the network device 104 may be ASF capable, the management device 102 may utilize ASF based messaging to perform management of the network device 104.

More recently, WS-Management was proposed and developed as the next generation management protocol. The WS-Management is a specification based on Web Services, which typically utilize SOAP (XML based messaging) and HTTP (S) as a SOAP transport for communications. SOAP over HTTP(S) may require HTTP/TLS/TCP stack implementation, which may ensure improved security, reliability, and OS-independence. DMTF has defined a Common Information Model (CIM) based instrumentation, analogous to object oriented representation of management data, of a managed subsystem that may be accessed using the WS-Management protocol. Devices that may comprise Intelligent Platform Management Interface (IPMI) or ASF internal interfaces/protocols may be capable, wherein said devices may be managed, out-of-band, via WS-Management messages. For example, in instances where the network device 104 may comprise IPMI or ASF based internal communications within the components of the network device 104, the management device 102 may utilize WS-Management based messaging to perform management of the network device 104.

Consequently, UDP and/or TCP based communication, via the management connection 106, may be transmitted and/or received between the management device 102 and the network device 104 during ASF and/or WS-Management based operations. The management device 102 and/or the network device 104 may utilize network controllers to enable sending and/or receiving network traffic via the management connection 106. The network controller that may be utilized in the management device 102 and/or the network device 104 may process network traffic that may comprise ASF and/or WS-Management based messaging, which may be transmitted and/or received via UDP and/or UDP packets, respectively.

In an embodiment of the invention, the management connection 106 may be utilized to enable transmission and/or reception of indications based data and/or messaging between the management device 102 and the network device 104. The indications may be utilized to communicate information pertaining to relevant events and/or conditions which may occur within the network device. Data models, which may utilize CIM based implementation, may enable generation of the indications based data and/or messaging communicated between the management device 102 and the network device 104. Furthermore, the CIM based indications models may also be utilized to facilitate performing indications based subscription related operations in network device 104 and/or the management device 102 to enable communication of indications based data and/or messaging, and/or external access.

Figure 1B:
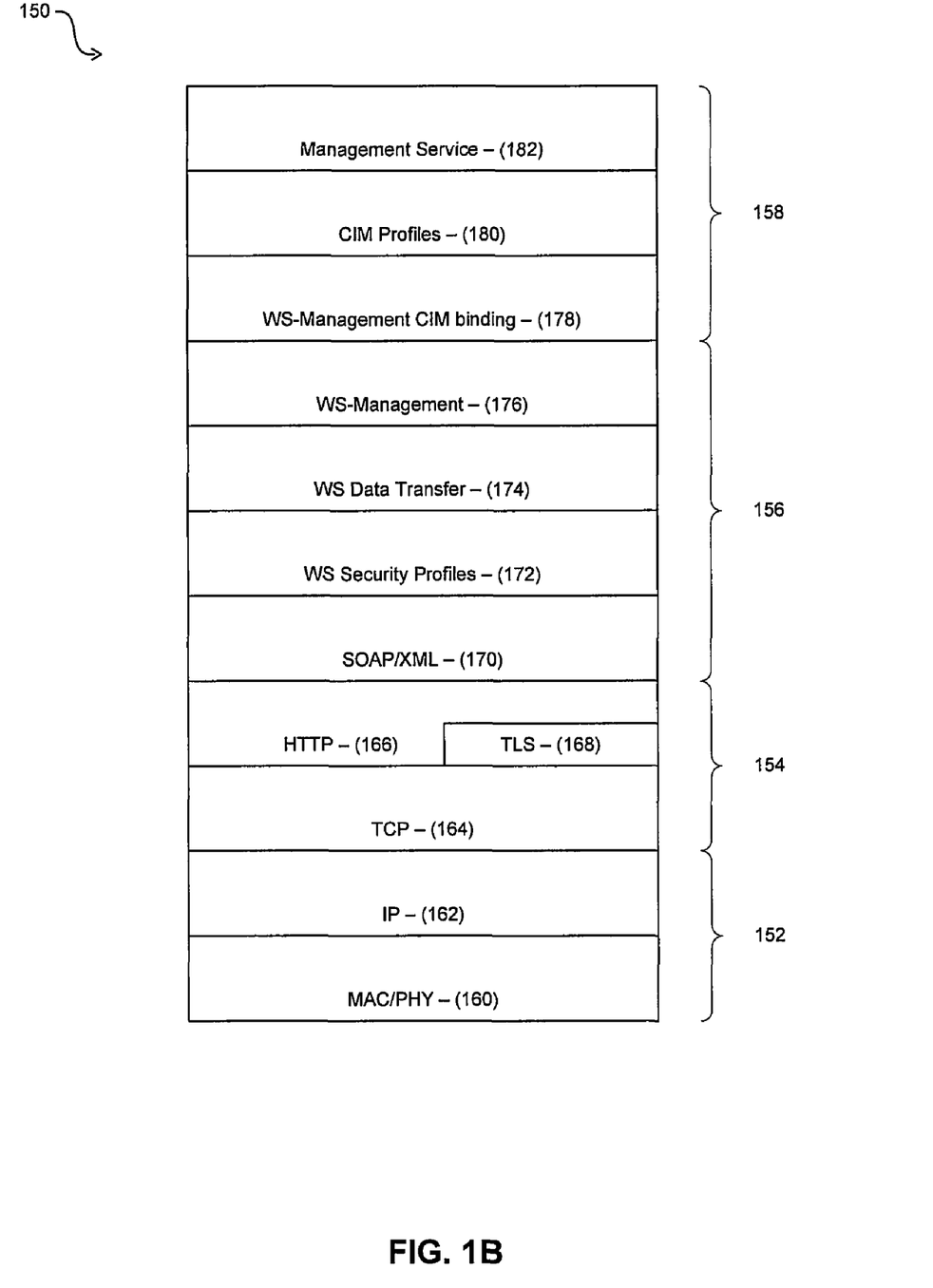
FIG. 1B is a block diagram illustrating an exemplary protocol stack diagram for Web Service Management (WS-Management) based and Common Information Model (CIM) based services, in accordance with an embodiment of the invention.

FIG. 1B is a block diagram illustrating an exemplary protocol stack diagram for WS-Management and CIM based, services, in accordance with an embodiment of the invention. Referring to FIG. 1B, there is shown a CIM/WS-Management stack 150 that may comprise physical/network layers 152, Simple Object Access Protocol (SOAP) transport layers 154, Web-Service (WS) layers 156, applications/profiles layers 158, a Medium Access Control/Physical (MAC/PHY) layer 160, an Internet Protocol (IP) layer 162, a Transmission Control Protocol (TCP) layer 164, a Hyper Text Transfer Protocol (HTTP) layer 166, a Transport Layer Security (TLS) layer 168, a Simple Object Access Protocol (SOAP)/XML layer 170, a Web-Services (WS) security profiles layer 172, a Web-Services (WS) data transfer layer 174, a WS-Management layer 176, a WS-Management CIM binding layer 178, a CIM profiles layer 180, and a management service 182.

Utilizing the CIM/WS-Management stack 150 may enable generating and/or processing the WS-Management based data and/or messaging that may be utilized to request and/or perform management services based on CIM operations. The CIM/WS-Management stack 150 may be based on the WS-Management services standards.

The physical/network layers 152 may comprise layers that may enable such functionality as physical transmission and/or reception of network traffic packets. The MAC/PHY layer 160 may comprise functionality that may enable use of physical link and/or channel allocation and management, for example. Additionally, because the WS-Management messaging may utilize TCP based communication, the physical/network layers 152 may also comprise the IP layer 162 to enable performing TCP communication.

The SOAP transport layers 154 may enable performing transport related functionality on SOAP based messages, which may be utilized to transmit and/or receive the WS-Management based data and/or messaging via network traffic. The SOAP transport layers 154 may comprise the TCP layer 164, HTTP layer 166, and/or the TLS layer 168. The TCP layer 164 may enable handling TCP messages, which may comprise adding TCP headers to transmitted messages, and/or extracting TCP data from received messages. The HTTP layer 166 may enable performing HTTP based functionality on messages that may utilize the HTTP 1.1 protocol, for example, to establish request and response server-client like connectivity, for example. Within the HTTP functionality, the TLS layer 168 may enable performing security operations on HTTP messages, which may comprise as encryption and/or decryption of HTTP messaging, for example.

The Web-Service (WS) layers 156 may enable performing handling of WS-Management based messaging. The WS layers 156 may comprise the SOAP/XML layer 170, the WS security profiles layer 172, the WS data transfer layers 174, and/or the WS-Management layer 176. The SOAP/XML layer 170 may enable handling SOAP XML-based messaging utilized to transmit and/or receive WS-Management based messaging via the HTTP layer 166. The WS security profiles layer 172 may comprise security definitions and/or mechanisms that may be specific to WS-management services. The WS data transfer layer 174 may comprise data transfer definitions and/or mechanisms that may be specific to WS-management services. For example, the WS data transfer layer 174 may comprise standards-based WS-transfer, WS-Enumeration, and/or WS-Eventing for transferring the management information. The WS-Management layer 176 may comprise definitions and/or mechanisms that may be utilized to process, generate, and/or read WS-Management based messaging.

The applications/profiles layers 158 may enable handling of application and/or profiles based messaging that may be performed via WS-Management. The applications/profiles layers 158 may comprise the WS-Management CIM binding layer 178, the CIM profiles layer 180, and/or the management service 182. The WS-Management CIM binding layer 178 may enable handling of WS-Management messaging that may enable determining the appropriate CIM binding corresponding to data description in received and/or transmitted WS-Management messaging. The CIM profiles layer 180 may enable utilizing appropriate CIM profiles that may enable performing and/or requesting one or more management operations and/or services. The management service 182 may enable performing and/or requesting management services.

In an exemplary embodiment of the invention, the CIM/WS-Management stack 150 may be utilized to enable CIM based indications related operations. For example, the CIM/WS-Management stack 150 may be utilized within the management device 102 and/or the network device 104 to facilitate transmission and/or reception of indications based data and/or messaging. Additionally, CIM based data models may be utilized to enable platform independent indications based operations and/or communication; wherein CIM data models may be employed to enable generation, transmission, and/or reception WS-Management messages which may be utilized to control and/or access indications related operations and/or data. CIM Indications models may provide a CIM based eventing model for communicating alert or event related information. Such information may be communicated using a web service based management protocol, for example the CIM/WS-Management stack 150. The indications may be combined with WS-Eventing, within the WS data transfer layer 174, to communicate indications related information. Various types of indications may be communicated via such models. For example, there may be three types of indications available via a CIM indications model based on the CIM/WS-Management stack 150. First, Alert Indications may, for example, utilize CIM_AlertIndication classes to communicate events. The alert indications may use message ID/string based approach for communicating the indication messages. The message ID, message, and/or message arguments may be used to describe formatted message. A message registry may be used to list the standard message identifiers and formatted messages. An exemplary embodiment of the invention may use a message registry to populate message ID and message properties for an alert indication message. Second, Simple Network Management Protocol (SNMP) Trap Indications may use, for example, CIM_SNMPTrapIndication to map, for example, Platform Event Traps (PETs) to indications. The properties of CIM_SNMPTrapIndications may represent SNMP Trap PDU fields. There may be one-to-one mapping of a PET to an instance of CIM_SNMPTrapIndication. The PET information may be preserved for this type of indications. The SNMPTrapIndications may provide a simple transformation of a PET into a CIM based indication message, for example. Finally, Lifecycle Indications may be utilized to describe changes in the instantiated CIM based indications related objects such as create, delete, and modify operations on the instances of objects.

Figure 2A:
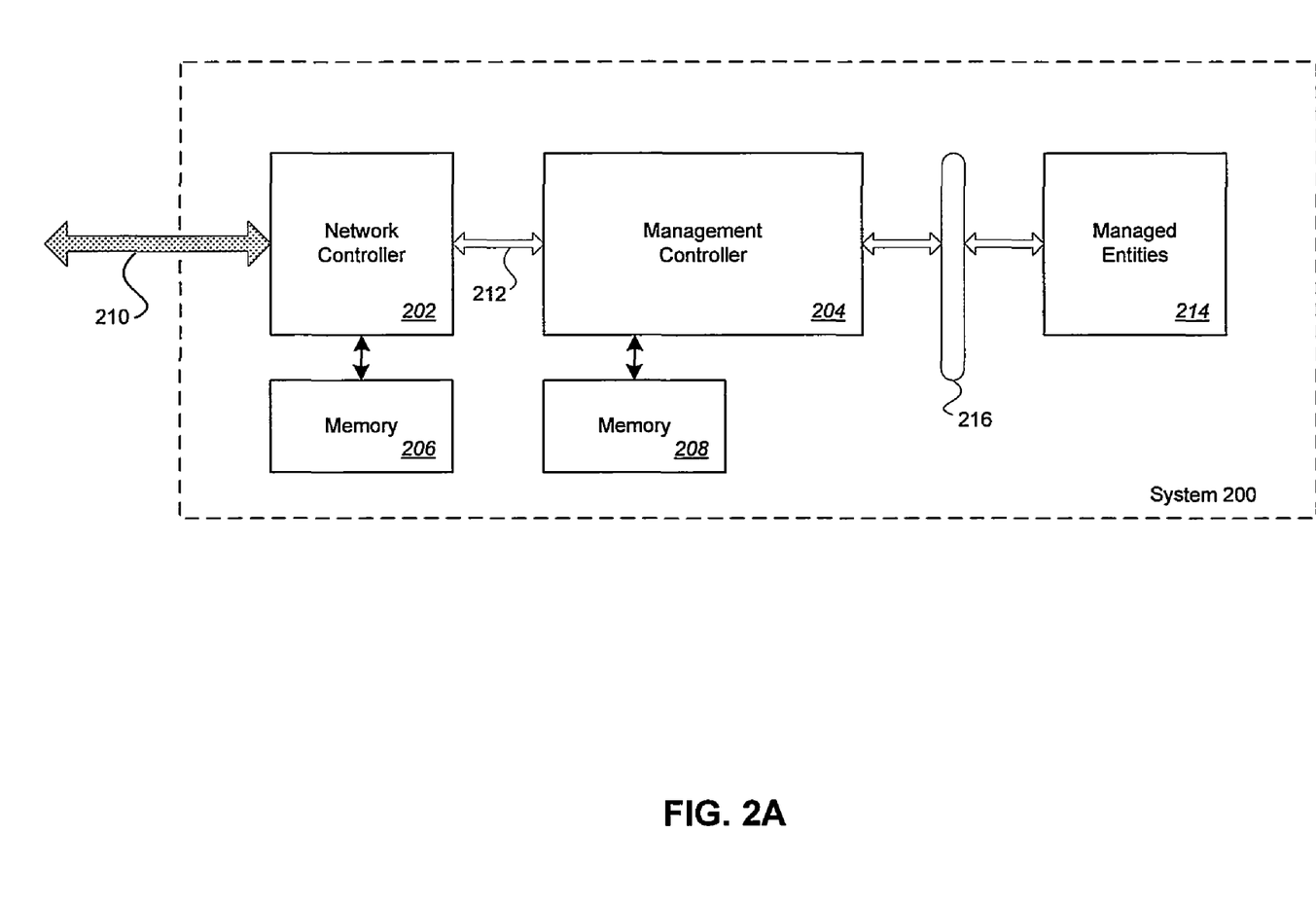
FIG. 2A is a block diagram that illustrates an exemplary system that comprises a management controller, which may be utilized to enable processing of CIM indications based event control and data transfers, in accordance with an embodiment of the invention.

FIG. 2A is a block diagram that illustrates an exemplary system that comprises a management controller, which may be utilized to enable processing of CIM indications based event control and data transfers, in accordance with an embodiment of the invention. Referring to FIG. 2A, there is shown a system 200, a network controller 202, a management controller 204, a network memory 206, a management memory 208, a network traffic 210, a management traffic 212, managed entities 214, and a management bus 216.

The system 200 may comprise the network controller 202, the management controller 204, the network memory 206, the management memory 208, the managed entities 214, the management bus 216, and may also comprise suitable logic, circuitry, and/or code that may enable reception, transmission, and/or processing of network traffic; and/or participating in management operations based on one or more management standards. For example, system 200 may be integrated in the management device 102 and/or the network device 104 to enable performing WS-Management and/or ASF management operations, substantially as described in FIG. 1A.

The network controller 202 may comprise suitable logic, circuitry, and/or code that may enable handling of network traffic, for example the network traffic 210, which may be received and/or transmitted by the system 200. The network memory 206 may comprise suitable logic, circuitry, and/or code that may enable storage and/or retrieval of data and/or code, which may be utilized by the network controller 202, for example. In this regard, the network memory 206 may comprise different memory technologies, including, for example, non-volatile random access memory (NVRAM) and/or Flash memory.

The management controller 204 may comprise suitable logic, circuitry, and/or code that may enable processing of management traffic, received and/or transmitted via the network controller 202 for example, which may be based on a specific management standard including, for example, WS-Management. The management controller 204 may also be enabled to interact with other components and/or subsystems in the system 200 to facilitate reception, transmission, and/or processing of management messaging to perform specific management operations. For example, the management controller 204 may be enabled to manage, process, and/or control indications based operations and/or messaging based on one or more specific protocols. The management controller 204 may, for example, be enabled to support CIM based indication related operations. The management controller 204 may, for example, be enabled to generate indications messaging and/or data that may be communicated based on the CIM/WS-Management stack 150. Additionally, the management controller 204 may be enabled to interact with the managed entities 214, via the management bus 216, to query, log, and/or store messaging and/or data pertaining to events, in the managed entities 214, which may trigger communication of CIM based indications. The management memory 208 may comprise suitable logic, circuitry, and/or code that may enable storage and/or retrieval of data and/or code, which may be utilized by the management controller 204, for example. In this regard, the management memory 208 may comprise different memory technologies, including, for example, non-volatile random access memory (NVRAM) and/or Flash memory.

The network traffic 210 may comprise received and/or transmitted packets communicated via a network connection, which may comprise, for example, an Ethernet (IEEE 802.3) connection. The network traffic 210 may comprise the management traffic 212. The management traffic 212 may comprise data and/or messages transmitted and/or received by the system 200 during management operations. For example, the management traffic 212 may comprise WS-Management based messaging communicated via the system 200 to enable the handling of WS-Management services.

The managed entities 214 may comprise suitable logic, circuitry, and/or code that may be controlled, managed, and/or utilized during management operations in the system 200. For example, the managed entities 214 may comprise an operating system (OS), a Basic Input/Output System (BIOS), a chipset, one or more sensors, one or more intelligent management devices, and/or one or more secondary management controllers that may reside within the system 200. The management bus 216 may comprise suitable logic, circuitry, and/or code that may enable transferring of data and/or messaging between the network controller 202, the application processor 204, and/or the managed entities 214 during management operations. For example, the management bus 216 may comprise a System Management Bus (SMBus) and/or a Peripheral Component Interconnect Express (PCI-e) bus.

In operations, the network controller 202 may enable processing the network traffic 210. The network controller 202 may utilize the network memory 206 to retrieve and/or store data and/or code that may be utilized during processing of the network traffic 210. The management controller 204 may be utilized, in the system 200, to enable processing of the management traffic 212 transmitted and/or received via the network controller 202, and communicated via the network traffic 210. The management controller 204 may also be utilized to enable performing management based operations within the system 200. The management controller 204 may utilize the management memory 208 to retrieve and/or store data and/or code that may be utilized during processing of management traffic 214.

In an exemplary embodiment of the invention, the system 200 may be utilized to enable performing indications based operations and/or messaging, which may utilize a management protocol. For example, the system 200 may be integrated within the network device 104 and/or the management device 102 to enable performing indications related operations and/or messaging over WS-Management. The management controller 204 may communicate management based indications via the management traffic 212. For example, during uplink operations, the management controller may communicate CIM based indications messaging, which may be formatted based on the CIM/VS-Management stack 150, via the management traffic 212, which may be sent to the network controller 202. The network controller may then process the management traffic 212 received from the management controller 204 to enable transmission via the network traffic 210, which may be based on a network connection, for example an Ethernet (IEEE 802.3) connection. During downlink operations, where the network controller 202 may be utilized to enable processing of network traffic 210 received in the system 200, the network controller 202 may forward management messaging and/or data to the management controller 204 via the management traffic 212. The received management traffic 212 may comprise CIM indications related messaging, formatted based on the CIM/WS-Management stack 150 for example. The downlink management messaging may comprise, for example, subscription related messaging to initiated, modify, filter, and/or delete indications based subscription in the system 200.

The management controller 204 may manage, perform, and/or process indications based messaging and/control. The managed entities 214 may not be aware of CIM binding performed via the management controller 204. Instead, the managed entities 214 may communicate to the management controller 204, via the management bus 216, information relating to one or more events that may occur within the managed entities 214. For example the managed entities 214 may comprise sensors that may generate events based information, dynamically, whenever specific conditions, specified via Platform Even Traps (PETs) for example, may occur. The management controller 204 may also initiate events polling to determine presence of conditions that may trigger generation of indications based messaging and/or data. The management controller 204 may then map received events information to CIM based indications based messaging and/or data that may be communicated external to the system 200, via the network controller 202.

One or more of the managed entities 214 may also be aware of CIM binding performed via the management controller 204 and/or enabled to perform some CIM based operations. For example, the chipset and/or the BIOS in system 200 may comprise CIM based classes that may enable them to communicate indications based alert messages and/or data. The managed entities 214 may communicate with the management controller 204, via the management bus 216, partial indications based information that may be utilized, via the management controller 204, to generate CIM based indications based messaging and/or data that may be communicated external to the system 200, via the network controller 202. For example, the managed entities 214 may communicate to the management controller 204 message IDs and/or various arguments, which may utilized within the externally communicate data and/or messaging. Communication of the indications based information may be initiated, dynamically, within the managed entities 214, or the management controller 204 may also initiate polling of indications related information, utilizing message IDs and/or arguments for example, to determine existence of conditions that may trigger generation of indications based messaging and/or data that may be communicated external to the system 200. Indications related information may be also be logged until indications based messaging and/or data may be communicated.

The management controller 204 may also function as a pass-through router of fully formatted indications. For example, where the managed entities 214 may comprise secondary management controllers, one or more of these secondary management controllers may be enabled to generate fully formatted CIM based indications. Consequently, CIM based indications may be communicated via the management bus 216 to the management controller 204, wherein the management controller 204 may forward the indications via management traffic 212, which may be sent to the network controller 202, and may then be processed to enable transmission by the network controller 202. During downlink operations, management messaging received in the management controller 204 from the network controller 202 via the management traffic 212, which may comprise indication related messaging and/or messaging targeted for one or more of the secondary management controller in the managed entities 214, may be forwarded without processing, in the management controller 204, via the management bus 216.

The management controller 204 may also control and/or manage indications based subscription operations. For example, external communication of indications based messaging and/or data may require the presence of a subscription within the management controller 204 to allow external transmission of the messaging. Consequently, the management controller 204 may support processing of CIM based messaging, for example, which may enable initiating subscription, by external entities, in the system 200, to enable communication of indications based messaging and/or data. The management controller 204 may also support processing of CIM based messaging to modify and/or delete currently existing subscription via the management controller 204.

Figure 2B:
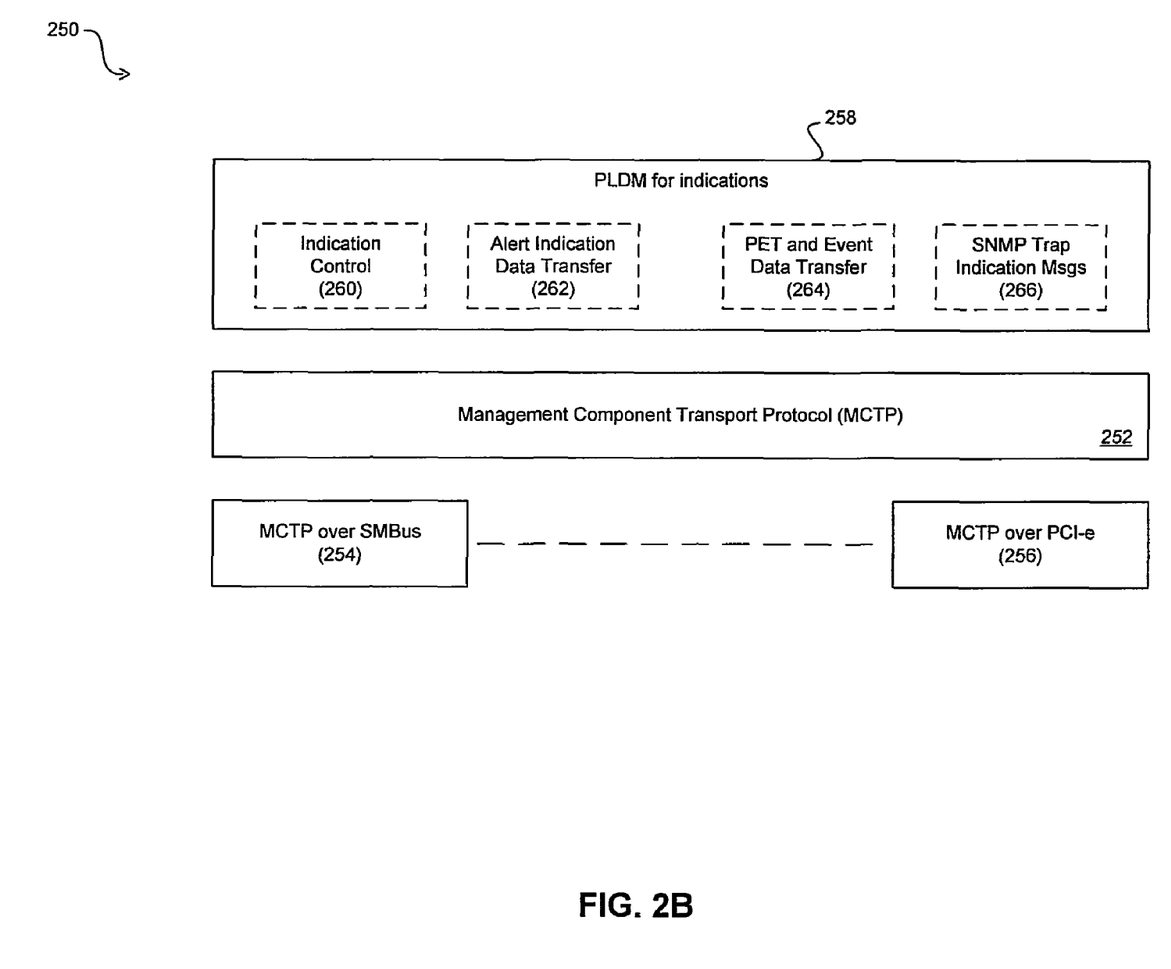
FIG. 2B is a block diagram illustrating an exemplary structure of a Platform Level Data Model (PLDM) based stack that may enable communication between a management controller and other components in a system to support indications based event control and data transfers, in accordance with an embodiment of the invention.

FIG. 2B is a block diagram illustrating an exemplary structure of a PLDM based stack that may enable communication between a management controller and other components in a system to support indications based event control and data transfers, in accordance with an embodiment of the invention. Referring to FIG. 2B, there is shown a Platform Level Data Model (PLDM) based stack 250 that may comprise a management component transport protocol (MCTP) layer 252, an MCTP-over-SMBus layer 254, an MCTP-over-PCI-e layer 256, a PLDM-for-indications layer 258, an indication control sub-layer 260, an alert indication data transfer sub-layer 262, a PET and event data transfer sub-layer 264, and an SNMP Trap Indication messaging transfer sub-layer 266.

The PLDM based stack 250 may comprise suitable logic and/or code that may enable utilizing PLDM over MCTP communication between platform management subsystem components, wherein indications related messaging, information, and/or data may be exchange. The Platform Level Data Model (PLDM) based messaging may enable platform-independent communication between dedicated management entities in managed devices and subsystems and/or components in the managed devices, wherein management messaging may be utilized uniformly in a managed network regardless of the variations and/or specification of each of the platforms in the network. PLDM based messaging may provide efficient access to low-level platform monitoring, control, and data transfer functions such as, for example, temperature, fan, voltage, inventory data, event data transfer, and boot control. The PLDM may be utilized in conjunction with MCTP to enable compatibility with various types of intra-system connectivity. For example, PLDM over MCTP may define data representations and commands that may abstract the platform management hardware. PLDM over MCTP definition may define common fields for PLDM messages that may be encapsulated as MCTP messages. These common fields support the identification of payload type, PLDM type, and PLDM command. Consequently, the PLDM based stack 250 may be utilized to enable platform-independent indications based messaging and data transfer within a system, for example system 200.

The MCTP layer 252 may comprise suitable logic and/or code that may enable performing transport related functionality based on the MCTP protocol between platform management subsystem components. For example, the MCTP layer 252 may comprise functionality that may enable transporting PLDM based messaging via a system bus, for example the management bus 216. In this regard, the MCTP layer 252 may comprise functionality that may enable performing encapsulating and/or multiplexing PLDM data into MCTP frames, performing logical addressing, and/or preconditioned reassembly. To enable physical transmission and/or reception of MCTP packets, the PLDM stack 250 may comprise various layers that enable binding the MCTP layer 252 onto various available buses in a system. The MCTP-over-SMBus layer 254 may enable binding of the MCTP layer 254 onto a SMBus. The MCTP-over-SMBus layer 254 may comprise functionality that may enable transmission and/or reception of MCTP packets via a SMBus. Similarly, the MCTP-over-PCI-e layer 256 may enable binding the MCTP layer 254 onto a PCI-e bus. The MCTP-over-PCI-e layer 254 may comprise functionality that may enable transmission and/or reception of MCTP packets via a PCI-e bus.

The PLDM-for-indications layer 258 may comprise suitable logic and/or code that may enable communication of PLDM based indications related messaging, information, and/or data between platform management subsystem components. The PLDM-for-indications layer 258 may comprise for example, the indication control sub-layer 260, the alert indication data transfer sub-layer 262, the PET and event data transfer sub-layer 264, and/or the SNMP Trap Indication messaging transfer sub-layer 266.

The indication control sub-layer 260 may comprise suitable logic and/or code that may enable communication of indications control messaging and/or data between platform management subsystem components. For example, the indication control sub-layer 260 may comprise commands and/or data representations that may enable the management controller 204 and/or the managed entities 214 to utilize standardized formats in communicating messaging that enable performing indications based control operations.

The alert indication data transfer sub-layer 262 may comprise suitable logic and/or code that may enable communication of alert indications data between platform management subsystem components. For example, the alert indication data transfer sub-layer 262 may comprise commands and/or data representations that may enable the management controller 204 and/or the managed entities 214 to utilize standardized formats in communicating indications related alert data when such data may be triggered in the managed entities 214 and/or are polled via the management controller 204.

The PET and event data transfer sub-layer 264 may comprise suitable logic and/or code that may enable communication of PET and event data between platform management subsystem components. For example, the PET and event data transfer sub-layer 264 may comprise commands and/or data representations that may enable the management controller 204 and/or the managed entities 214 to utilize standardized formats in communicating data PET and/or events may be triggered in the managed entities 214 and/or may be polled via the management controller 204.

The SNMP Trap Indication messaging transfer sub-layer 266 may comprise suitable logic and/or code that may enable communicating SNMP trap indication related messaging between platform management subsystem components. For example, the SNMP Trap Indication messaging transfer sub-layer 264 may comprise commands and/or data representations that may enable the management controller 204 and/or the managed entities 214 to utilize standardized formats in communicating SNMP trap indication related messaging.

Figure 3:
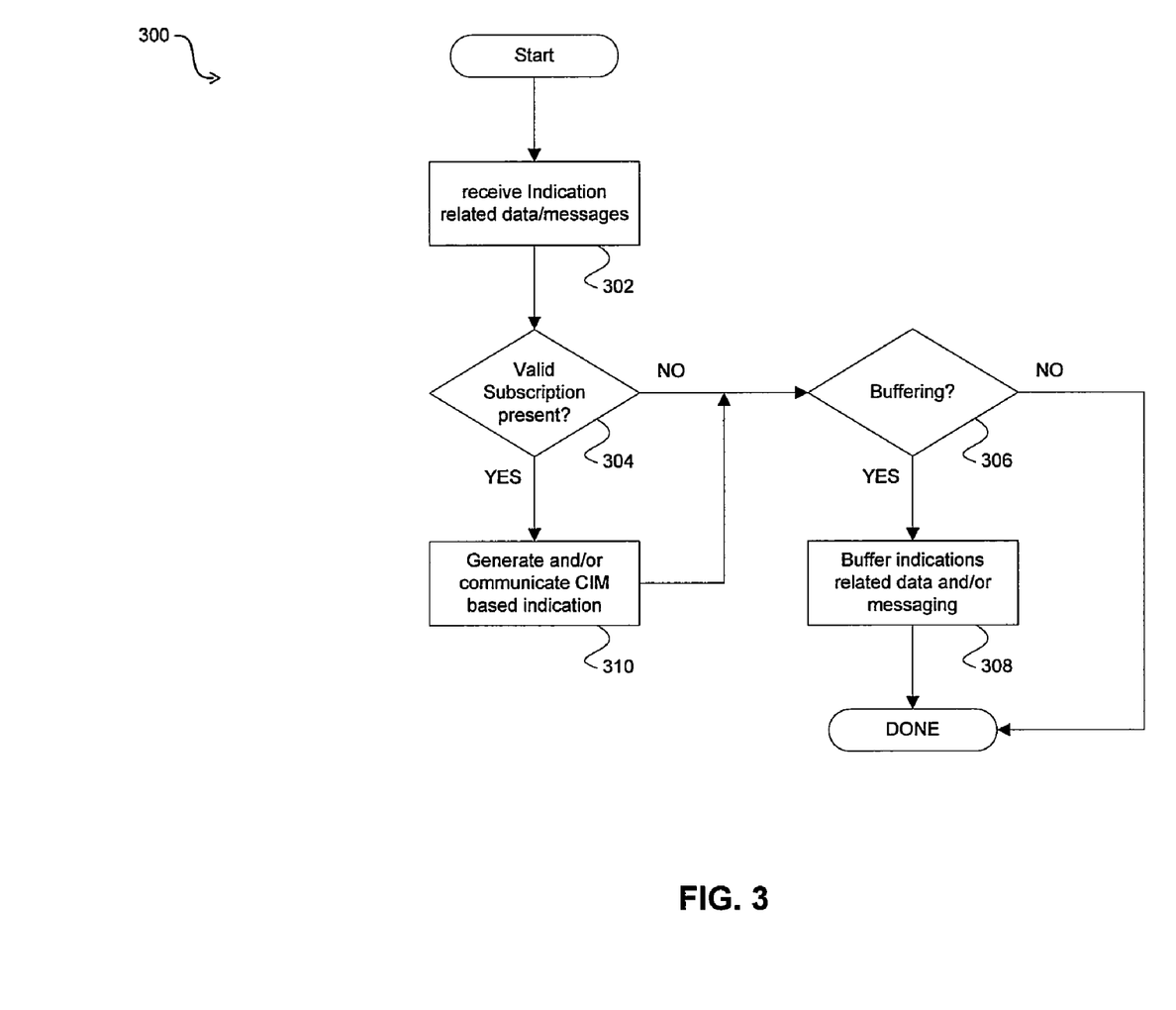
FIG. 3 is an exemplary flow diagram illustrating processing of PLDM indications based event control and data transfer via a management controller, in accordance with an embodiment of the invention.

FIG. 3 is an exemplary flow diagram illustrating processing of PLDM indications based event control and data transfer via a management controller, in accordance with an embodiment of the invention. Referring to FIG. 3, there is shown a flow chart 300 comprising a plurality of exemplary steps performed in a system, for example the system 200, to enable performing PLDM indications based event control and data transfer.

In step 302, indications related data and/or message may be received in a management controller. The management controller 204 may, for example, receive indications related data, information, and/or messaging from the managed entities 214, via the management bus 216 for example. The received data, information, and/or messaging may be based on events triggered and/or generated in the managed entities 214. The triggering of events in the managed entities 214 may be performed dynamically, or may based on polling by the management controller 204. The received data, information, and/or messaging may also comprise partial and/or full indications that may be processed via the managed entities 214, substantially as described in FIG. 2A and FIG. 2B.

In step 304, a determination of presence of valid indications subscription in the management controller may be performed. The management controller 204 may, for example, determine whether a valid subscription may be present, which may enable generating and/or forwarding indications external to the system 200, based on received data, information, and/or messaging from the managed entities 214. In instances where it may be determined that no valid subscription may be present in the management controller, the exemplary steps may proceed to step 306. In step 306, a determination of the need to buffer indications based data and/or messaging may be performed. The management controller 204 may, for example, buffer received data, information, and/or messaging from the managed entities 214; and/or generated and/or communicated indications. The buffering may enable, for example, later use in cases where a valid subscription may not be available at the point data and/or events may be received, but such subscription may still be anticipated subsequently. In instances where it may be determined that no buffering need be performed, the exemplary steps may terminate. In instances where it may be determined that buffering need be performed, the exemplary steps may proceed to step 308. In step 308, the management controller 204 may buffer received data, information, and/or messaging from the managed entities 214; and/or generated and/or communicated indications.

Returning to step 304, in instances where it may be determined that valid subscription may be present in the management controller, the exemplary steps may proceed to step 310. In step 310, indications may be generated and/or communicated via the management controller 204. In instances where it may be determined that valid subscription may be present, the management controller 204 may communicate management based indications via the network controller 202. The management controller 204 may, during uplink operations, communicate CIM Indications based messaging over WS-Management, which may be formatted based on the CIM/WS-Management stack 150, via the management traffic 212, which may be sent to the network controller 202. The network controller 202 may then process the management traffic 212 received from the management controller 204 to enable transmission via the network traffic 210. During downlink operations, the network controller 202 may enable processing of network traffic 210, and may forward management messaging and/or data to the management controller 204 via the management traffic 212. In instances where the received management traffic 212 may comprise CIM Indications based messaging over WS-Management, the management controller 204 may process the received management messaging and/or forward corresponding messages and/or data to the managed entities 214.

Various exemplary embodiments of the invention may comprise a method and system for platform level data model for indications based event control and data transfer. In system 200, which may be integrated into the network device 104 and/or the management device 102 to enable participating in management operations, the management controller 204 may be utilized to enable performing indications based management operations. The indications based management operations may be based on a management model that may utilize WS-Management CIM implementations. The management controller 204 may communicate, within the system 200, with the managed entities 214 during indications based management operations. The managed entities 214 may comprise an operating system (OS), a Basic Input/Output System (BIOS), chipsets, sensors, intelligent management devices, and/or one or more secondary management controllers. The management bus 216 may be operable to enable interactions between the management controller 204 and the managed entities 214 to facilitate communication of indications based data and/or messaging.

The indications based management operations may comprise generation and/or communication of indications via the management controller 204 based on event generated in the managed entities 216. The events generation may be performed dynamically within the managed entities 216, wherein the indications based data and/or messaging may be communicated to the management controller 204 when events are generated. The dynamic events generation may be based on event traps in the managed entities 216. The management controller 204 may also initiate events generation in the managed entities 216. The management controller 204 may enable processing of partially generated indications, via the managed entities 214, and/or as pass-through router for full indications processed via the managed entities 214. The indications based management operations may also comprise subscription related operations wherein the management controller 204 may enable performing processing of subscription requests, subscription modifications, and/or subscription deletions to facilitate external access, via system 200, to request and/or obtain indications based data and/or messaging.

Another embodiment of the invention may provide a machine-readable storage, having stored thereon, a computer program having at least one code section executable by a machine, thereby causing the machine to perform the steps as described herein for platform level data model for indications based event control and data transfer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising
performing, via a management controller in a device, an indication-based management service in said device, wherein said performing comprises:
receiving by said management controller, event data from one or more managed entities within said device, wherein said one or more managed entities are communicatively coupled to said management controller;
generating by said management controller based on said received event data, one or more Indication messages that are formatted based on Common Information Model (CIM) data models, wherein said generation comprises mapping at least a portion of said received event data to one or more fields in at least one of said one or more CIM based Indication messages;
receiving by said management controller, partially generated Indication messages transmitted by one or more of said managed entities;
completing by said management controller, the partially generated indication messages; and
communicating via a network controller communicatively coupled to said management controller, said one or more generated Indication messages and said completed partially generated indication external to said device,
wherein said received partially generated Indication messages are formatted in accordance with a particular management protocol and said completed Indication messages are also formatted in accordance with the particular management protocol.

2. The method according to claim 1, wherein said indication-based management service is based on Common Information Model (CIM) data models.

3. The method according to claim 1, wherein said managed entities comprise an operating system (OS), a Basic Input/Output System (BIOS), a chipset, sensors, intelligent management devices, and/or one or more secondary management controllers.

4. The method according to claim 1, comprising receiving said event data from said managed entities via one or more management buses.

5. The method according to claim 4, wherein said one or more management buses comprise a System Management Bus (SMBus), and/or a Peripheral Component Interconnect Express (PCI-e) bus.

6. The method according to claim 1, comprising performing, via said management controller, indication-based subscription operations in said device.

7. The method according to claim 6, wherein said indication-based subscription operations comprise processing, control, modification, and/or deletion of indication-based subscriptions in said device.

8. The method according to claim 1, comprising operating said management controller as a pass-through router to enable routing fully generated indication messages transmitted and/or received via one or more of said managed entities, based on said indication-based management service, external to said device.

9. A network device, comprising:
- a management controller that is operable to perform an indication-based management service in said network device;
- a network controller that is operable to communicate data external to said network device; and
- a plurality of components in said network device that are managed via said management controller during said indication-based management service; wherein said indication-based management service comprises:
- generating in said plurality of managed components, event data based on events in said plurality of managed components;
- receiving by said management controller, said event data;
- generating by said management controller based on said received event data, one or more Indication messages that are formatted based on Common Information Model (CIM) data models, wherein said generation comprises mapping at least a portion of said received event data to one or more fields in at least one of said one or more CIM based Indication messages;
- receiving by said management controller, partially generated Indication messages transmitted by one or more of said managed components;
- completing by said management controller, the partially generated indication messages; and
- communicating via said network controller said one or more generated Indication messages and said completed partially generated indication messages to a management device communicatively coupled to said network device via said network controller.

10. The method network device according to claim 9, comprising wherein said indication-based management service comprises generating, via said managed entities, events that trigger generation of said event data that are handled by said indication-based management service in said management controller.

11. The method network device according to claim 10 comprising wherein said indication-based management service comprises performing said events generation via event based traps in said managed entities.

12. The method network device according to claim 10 comprising wherein said indication-based management service comprises initiating, via said management controller, said events generation in said managed entities components.

13. The method network device according to claim 10 comprising wherein said indication-based management service comprises performing, via said management controller, indication-based logging operations in said network device, while performing said events generation; wherein said logging operations enable creation and/or storage of information utilized to generate, transmit, and/or receive said indicate data and/or messaging.

14. The system network device according to claim 9, wherein said managed entities comprise an operating system (OS), a Basic Input/Output System (BIOS), a chipset, sensors, intelligent management devices, and/or one or more secondary management controllers.

15. The method network device according to claim 9, further comprising:
mapping at least a portion of said received event data to said one or more fields to generate another Indication messages.

16. The method network device according to claim 9, wherein the partially generated indication message includes a message identifier or an argument.

17. A system comprising:
- one or more circuits in a device, said one or more circuits comprising a management controller that is operable to perform an indication-based management service in said device, wherein said performing comprises:
- generating in said plurality of managed components, event data based on events in one or more managed entities within said device;
- receiving by said management controller, said event data;
- generating by said management controller based on said received event data, one or more Indication messages that are formatted based on Common Information Model (CIM) data models, wherein said generation comprises mapping at least a portion of said received event data to one or more fields in at least one of said one or more CIM based Indication messages;
- receiving by said management controller, partially generated Indication messages transmitted by said one or more managed entities;
- completing by said management controller, the partially generated indication messages;
- communicating via a network controller said one or more generated Indication messages and said completed partially generated indication messages to a management device communicatively coupled to said device via said network controller, wherein the network controller is operable lo communicate data external to said device;
- receiving by said management controller, fully generated indication messages received from one or more managed entities within said device, wherein said one or more managed entities are communicatively coupled to said management controller, and at least one of said one or more managed entities is a physical component in said device; and
- routing, via a network controller communicatively coupled to said management controller, said one or more fully generated indication messages external to said device,
- wherein said one or more circuits enable operating said management controller as a pass-through router.

18. The system according to claim 17, wherein said one or more circuits are operable to receive said event data from said managed entities via one or more management buses.

19. The system according to claim 18, wherein said one or more management buses comprise a System Management Bus (SMBus), and/or a Peripheral Component Interconnect Express (PCI-e) bus.

20. The system according to claim 17 wherein said one or more circuits enable performing, via said management controller, indication-based subscription operations in said device.

21. The system according to claim 20 wherein said indication-based subscription operations comprise processing, control, modification, and/or deletion of indication-based subscriptions in said device.

22. The system according to claim 17 wherein said one or more circuits enable generating, via said managed entities, events that trigger generation of said event data that are handled by said indication-based management service in said management controller.

23. The system according to claim 22 comprising performing said events generation via event based traps in said managed entities.

24. The system according to claim 22, wherein said one or more circuits enable initiating, via said management controller, said events generation in said managed entities.

25. The system according to claim 22, wherein said one or more circuits enable performing, via said management controller, indication-based logging operations in said device, while performing said events generation; wherein said logging operations enable creation and/or storage of information utilized to generate, transmit, and/or receive said indicate data and/or messaging.

26. The system according to claim 17 wherein said one or more circuits enable completing by said management controller, processing of partially generated indication messages transmitted and/or received via one or more of said managed entities, based on said indication-based management service.

* * * * *